(12) United States Patent
Sherrer et al.

(10) Patent No.: US 6,726,372 B1
(45) Date of Patent: Apr. 27, 2004

(54) 2-DIMENSIONAL OPTICAL FIBER ARRAY MADE FROM ETCHED STICKS HAVING NOTCHES

(75) Inventors: David W Sherrer, Blacksburg, VA (US); Dan A Steinberg, Blacksburg, VA (US); Mindaugas F Dautartas, Blacksburg, VA (US)

(73) Assignee: Shipley±Company, L.L.C., Marlborough, MA (US)

( * ) Notice: Subject to any disclaimer, the term of this patent is extended or adjusted under 35 U.S.C. 154(b) by 0 days.

(21) Appl. No.: 09/615,101

(22) Filed: Jul. 13, 2000

Related U.S. Application Data
(60) Provisional application No. 60/195,559, filed on Apr. 6, 2000.

(51) Int. Cl.[7] .................................................. G02B 6/36
(52) U.S. Cl. .......................................................... 385/83
(58) Field of Search ........................... 385/137, 65, 83, 385/88, 89

(56) References Cited

U.S. PATENT DOCUMENTS

| | | | |
|---|---|---|---|
| 3,864,018 A | 2/1975 | Miller | |
| 4,046,454 A | 9/1977 | Pugh, III | |
| 4,407,562 A | 10/1983 | Young | |
| 4,681,656 A | 7/1987 | Byrum | 156/645 |
| 4,695,760 A | 9/1987 | Anthony et al. | 313/348 |
| 4,744,627 A | 5/1988 | Chande et al. | |
| 5,044,711 A | 9/1991 | Saito | |
| 5,146,532 A | 9/1992 | Hodge | |
| 5,259,054 A | 11/1993 | Benzoni et al. | 385/89 |
| 5,430,825 A | 7/1995 | Leaman et al. | |
| 5,483,611 A | 1/1996 | Basavanhally | |
| 5,853,626 A | 12/1998 | Kato | 385/89 |
| 5,905,831 A | 5/1999 | Boudreau | 385/88 |
| 5,913,002 A | 6/1999 | Jiang | 385/88 |
| 6,263,220 B1 | 7/2001 | Mansour | 505/210 |

*Primary Examiner*—Neil Abrams
(74) *Attorney, Agent, or Firm*—Niels Haun; Jonathan D. Baskin

(57) ABSTRACT

A 2-dimensional optical fiber array having stacked sticks with fibers disposed between the sticks. The sticks are made by directional dry etching. The shape of the sticks is defined by a lithographic mask. Each stick has notches for holding the optical fibers. Since the sticks are defined by a lithographic mask, the fibers are accurately located in the 2-D array. In a alternative embodiment, the sticks are made by dry etching holes in a wafer, and then cleaving the wafer into sticks. To make the array. Fibers are disposed between the sticks and the sticks are reassembled so that cleaved surfaces are rejoined. Also, double-sided sticks can be made from a wafer having an etch stop layer. Directional dry etching is performed from both sides of the wafer.

45 Claims, 14 Drawing Sheets

66 Cleave line

2-DIMENSIONAL OPTICAL FIBER ARRAY MADE FROM ETCHED STICKS HAVING NOTCHES

RELATED APPLICATIONS

The present application claims the benefit of priority of provisional application No. 60/195,559, filed on Apr. 6, 2000, which is hereby incorporated by reference.

FIELD OF THE INVENTION

The present invention relates generally to 2-dimensional optical fiber arrays. More particularly, it relates to a 2-D fiber array structure and a method for making the structure. 2-D fiber arrays are often used in optical communications and optical switching devices.

BACKGROUND OF THE INVENTION

Arrays of optical fibers are used in fiber connectors, optical fiber switches (e.g. free space optical switches) and various kinds of sensors and displays. Typically in such optical fiber arrays, the optical fiber must be positioned with high accuracy (e.g. within +−1 micron).

1-dimensional (1-D) fiber arrays are commonly manufactured using wet anisotropic etching of <100> silicon to form V-grooves. Optical fibers placed in the V-grooves are accurately located.

2-dimensional fiber arrays for use in free-space optical switches are currently in high demand. A problem with 2-D optical fiber arrays is that they are very difficult to manufacture with high accuracy.

One technique used to make accurate 2-D fiber arrays is to directionally etch lithographically-defined holes through a wafer of material (e.g. silicon). Optical fibers are then inserted into the holes. The optical fibers are accurately located because the holes are defined lithographically. The holes can be made using reactive ion etching (RIE) or anisotropic wet etching of silicon, for example. A substantial problem with this technique is that inserting optical fibers through holes is very slow and tedious. Often, the optical fibers break during insertion.

Another technique for making 2-D arrays is to stack V-groove chips (e.g. silicon V-groove chips) having V-grooves on both sides of the chip. A substantial problem with this technique is that the location of the optical fibers is dependent upon the thickness of the substrates used to make the V-groove chips. Since it is difficult to control the thickness of substrates to the required tolerances, run-out error occurs in 2-D fiber arrays having several stacked V-groove chips. U.S. Pat. No. 5,044,711 to Saito discloses a 2-D optical fiber array made from stacked V-groove chips.

U.S. Pat No. 5,483,611 to Basavanhally discloses a 2-D optical fiber array having stacked 1-D V-groove arrays. The apparatus of Basavanhally employs mechanical adjustments for positioning the 1-D V-groove fiber arrays.

U.S. Pat No. 4,407,562 to Young discloses an optical switch having a 2-D fiber array made from wafers having V-grooves. The 2-D fiber array is made from stacked V-groove chips.

U.S. Pat. No. 3,864,018 to Miller discloses a 2-D fiber array made from a stack of V-groove chips. The thickness of the V-groove chips must be accurately controlled for accurate fiber positioning.

U.S. Pat. No. 4,046,454 to Pugh et al. discloses yet another 2-D fiber array made from stacking V-groove chips.

The fiber array of Pugh et al. has layers of compliant material that press optical fibers into the V-grooves.

U.S. Pat. No. 5,146,532 to Hodge discloses an optical fiber retaining device for holding optical fibers. The device has interlocking plastic pieces that can be stacked. The fiber holder of Hodge is not suitable for making precision 2-D optical fiber arrays.

There exists a need in the art of optical fiber devices for an accurate 2-dimensional fiber array that is easy to assemble. Such a 2-D fiber array would be useful for making optical switches and other devices.

OBJECTS AND ADVANTAGES OF THE INVENTION

Accordingly, it is a primary object of the present invention to provide a 2-dimensional optical fiber array that:

1) is easy to assemble and does not require insertion of optical fibers through tiny holes;
2) provides extremely accurate alignment of optical fibers;
3) provides for arbitrary 2-D fiber arrangements (e.g. hexagonal grid, square grid) defined according to a lithographic pattern;
4) does not require the use of chips having accurately defined thickness.

These and other objects and advantages will be apparent upon reading the following description and accompanying drawings.

SUMMARY OF THE INVENTION

These objects and advantages are attained by a 2-D optical fiber array having a plurality of stacked, etched sticks, and an optical fiber disposed between the etched sticks. The etched sticks have notches that form cages for holding the optical fibers. The notches have surfaces that are directionally dry-etched in a direction perpendicular to a front surface the array (the optical fiber is roughly perpendicular to the front surface).

The etched sticks may have top and bottom surfaces that are directionally dry etched. Alternatively, the etched sticks have top and bottom surfaces that are cleaved surfaces. In case the top and bottom surfaces are cleaved, the etched sticks are stacked so that complementary cleaved surfaces are adjacent to one another.

The etched sticks can also have alignment holes and alignment rods disposed in the alignment holes of the etched sticks. The alignment holes and alignment rods are oriented perpendicular to the optical fibers and extend through an interior of the etched sticks. Also, the front surface of the 2-D array can have etched pits or grooves (e.g. anisotropically etched V-grooves).

The etched sticks can be diffusion bonded together, glued together (e.g. with epoxy), or adhered together with materials such as spin-on-glass (SOG) or sol-gel materials. Preferably, the etched sticks are made of silicon.

In an alternative embodiment of the invention, the notches are not necessarily dry etched, but are made according to many other techniques such as laser drilling. In this embodiment, the top and bottom surfaces of the etched sticks are necessarily cleaved or directionally dry etched.

The present invention also includes a method for making the etched sticks by making a perforated chip having a 2-D array of holes. The perforated chip is cleaved to separate it into etched sticks. The cleave lines necessarily intersect the holes so that fibers can be placed in the resulting notches.

DETAILED DESCRIPTION

The present invention provides 2-dimensional (2-D) fiber arrays that are accurate and easy to assemble. According to the present invention, 'sticks' are directionally etched (e.g. using deep reactive ion etching, DRIE) from a wafer of material (e.g. silicon, silica). Each stick has notches for accommodating optical fibers. The dimensions and shape of the sticks and notches are defined by a lithographic mask. The fiber array is made by alternately stacking the optical fibers and notched sticks. In the present invention, the optical fibers and sticks are arranged so that the optical fibers extend in a direction parallel with the wafer thickness direction of the etched sticks. In an alternative embodiment, the etched sticks are cleaved from a wafer so that they have perfectly matching surfaces for stacking.

Figure 1:
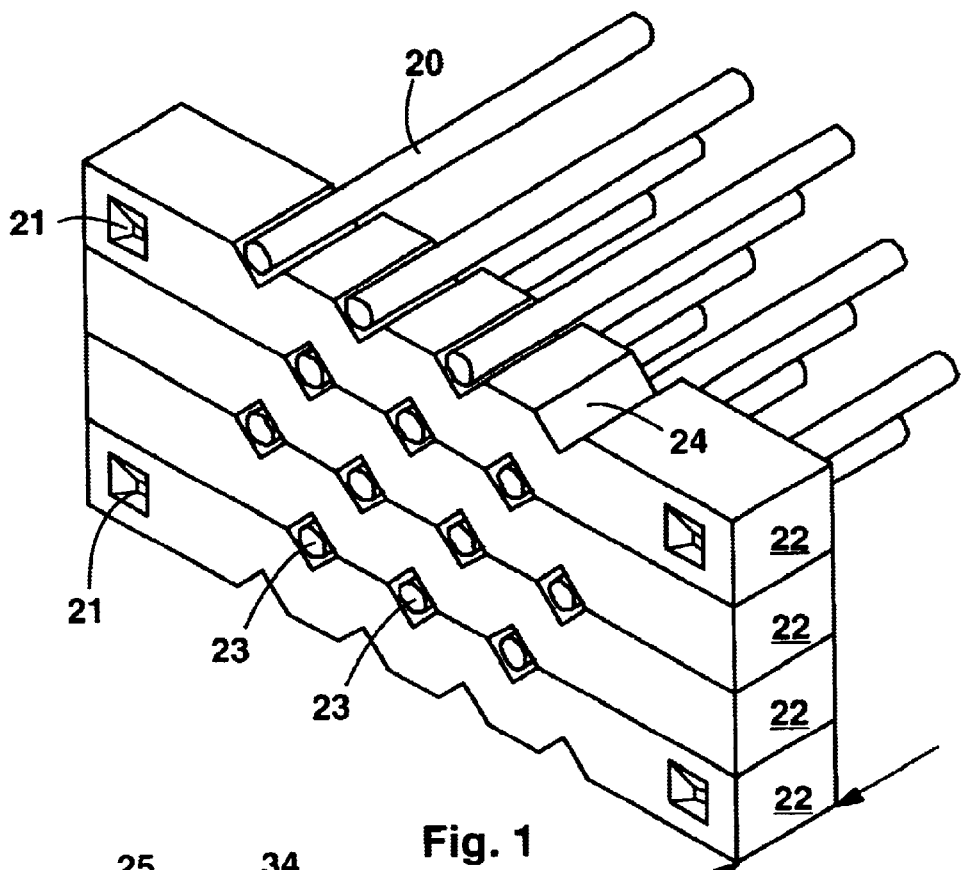
FIG. 1 shows a perspective view of the 2-D fiber array according to the present invention.

FIG. 1 shows a perspective view of the 2-D fiber array according to the present invention. The 2-D array of the present invention has optical fibers 20 disposed between etched sticks 22 having notches 24. The notches 24 form cages that enclose the optical fibers 20. The optical fibers 20 are preferably uncoated glass fibers known in the art. The fibers can be round or have other shapes (e.g. a D-shape, as known for polarization-maintaining fibers). The optical fibers 20 have endfaces 23. The etched sticks are preferably made of silicon. The sticks 22 can also be made of other materials that can be etched using directional dry etching (DRIE, RIE) techniques, such as silica. Preferably, thickness 26 is in the range of about 0.3–2 millimeters, or, more preferably, in the range of about 0.6–1 millimeter. Thickness 26 is determined by a thickness of the wafers used to make the etched sticks. During fabrication of the etched sticks, directional dry etching proceeds in a direction parallel with the optical fibers 20. Generally, for silica optical fibers, the etched sticks should have a thickness of about 4–7 times the diameter of the optical fibers.

Optionally, some or all of the etched sticks have micromachined pits 21. The pits 21 can be etched in silicon using an anisotropic etchant such as KOH, for example. The pits 21 can be made using other techniques as well, including isotropic etching, dry etching, or laser machining, for example. The pits 21 can be defined lithographically so that they are accurately located with respect to the mechanical features (e.g. notches) of the etched sticks. The pits 21 can be used to passively align optical components (e.g. lenslet arrays, laser arrays) to the optical fibers 20.

Figure 2:
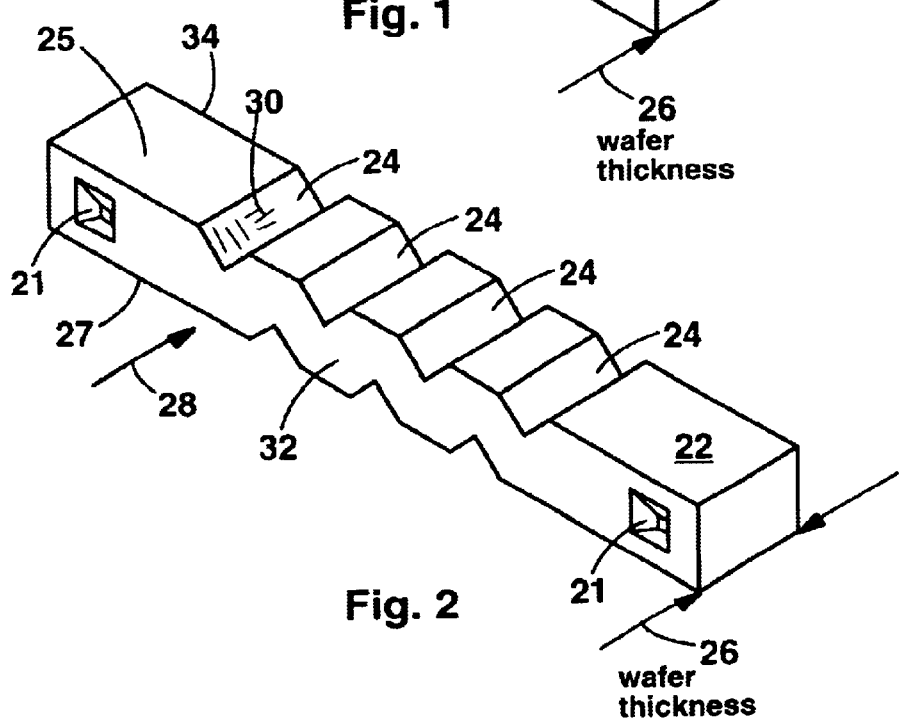
FIG. 2 shows a perspective view of a single etched stick.

FIG. 2 shows a single etched stick 22 according to the present invention. The etched stick has a thickness 26 that is defined by (i.e. equal to) a thickness of a wafer used to make the etched stick. A front surface 32 of the etched stick is the top or bottom surface of the wafer used to make the etched stick. Preferably, the front surface is the side of the wafer that was masked during directional dry etching of the stick.

The front surface 32 may also have etched pits 21. The etched stick 22 also has a rear surface 34 (not directly visible).

The notches 24 are formed by dry etching in a direction illustrated by arrow 28 (perpendicular to the front surface 32). As such, the notches typically have features 30 indicative of dry etching, such as microscopic scallops (typical of cyclical dry etching processes such as the Bosch process) or striations parallel with arrow 28. It is noted that the features 30 may not appear, or may be very small in some embodiments of the present invention. This is because some directional dry etching techniques (e.g. cryogenically cooling the wafer during etching) produce very smooth sidewalls with very little scalloping or striating. So although features 30 are commonly indicative of directional dry etching, the features 30 may not be present in some directionally dry etched sticks. In fact, it is generally preferable in the present invention for the directional dry etching technique to produce smooth sidewalls because smooth sidewalls tend to provide improved optical fiber alignment.

The etched stick 22 also has a top surface 25 and a bottom surface 27. Preferably, the top surface 25 and bottom surface 27 (not directly visible) are directionally dry etched sidewalls. The top and bottom surfaces can be made in the same step as the notches, and so the notches and top and bottom surfaces can have the same features 30 indicative of dry etching.

In a preferred embodiment, the notches 24 are the same size at the front surface 32 and rear surface 34 (i.e., the DRIE process used to make the sticks produces perfectly vertical sidewalls). However, this is generally not possible in practice; DRIE typically has a nonzero undercut angle.

Figure 3:
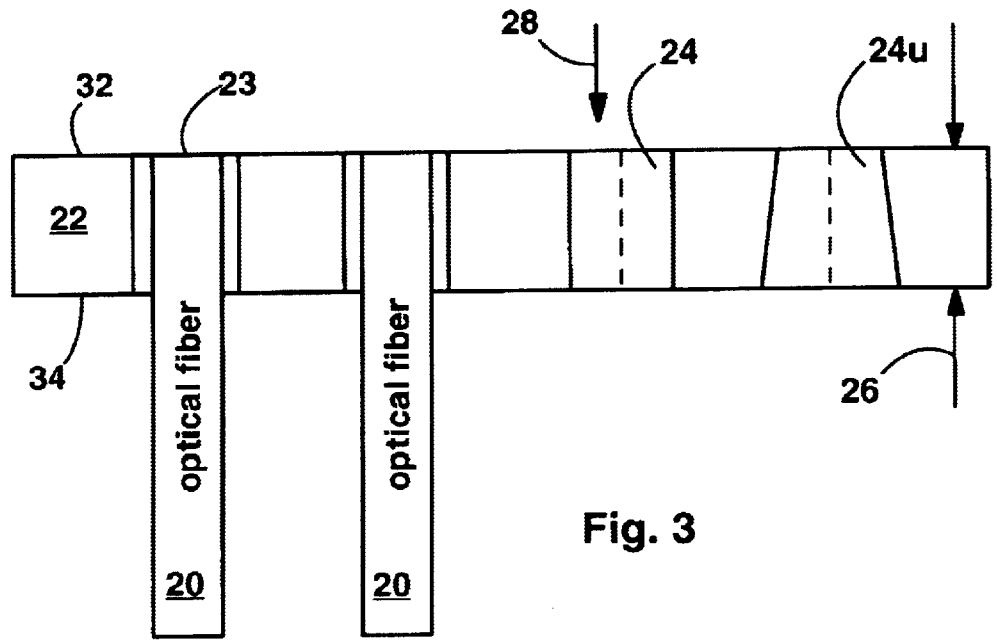
FIG. 3 shows a top view of optical fibers disposed in the notches of an etched stick.

FIG. 3 shows a top view of several optical fibers disposed in notches 24 of an etched stick. DRIE processes typically cannot produce perfectly vertical sidewalls, but rather produce slightly undercut sidewalls. Therefore, it is preferable for the optical fibers 20 to be placed so that fiber endfaces 23 are located at the surface of the etched stick that was masked during dry etching. For example, if the front surface 32 was masked during dry etching of the notches 24, then the optical fiber 20 should be oriented as shown, with the fiber endfaces 23 flush with the front surface 32. Arranging the optical fiber endfaces 23 on the masked side of the etched sticks 22 provides for improved alignment of the optical fibers. Notch 24u illustrates undercutting where the dry etching mask was on the front face 32. Notch 24u is wider on the rear surface 34 of the etched stick 22.

Figure 4A:
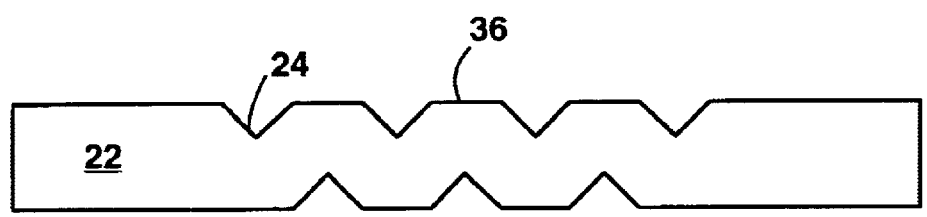
FIGS. 4a–c show front views of various designs for etched sticks.
Figure 4B:
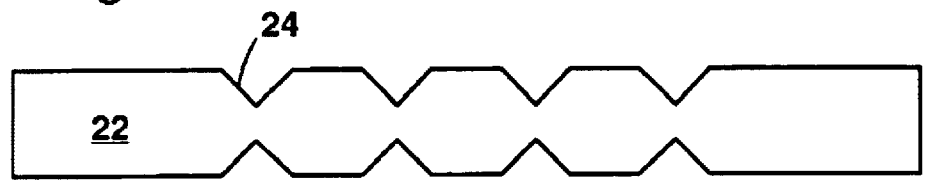
Figure 4C:
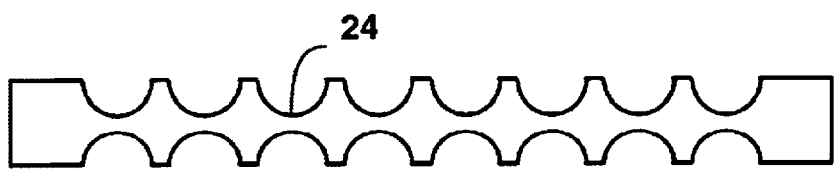

FIGS. 4a–4c show front views of several designs for etched sticks.

FIG. 4a shows an etched stick having notches 24 staggered so that the etched stick has a zig-zag shape. Preferably, the etched sticks have flat portions 36 between the notches 24.

FIG. 4b shows an etched stick having notches 24 aligned opposite one another. This embodiment is not preferred because the stick is susceptible to breaking at the notch corners.

FIG. 4c shows an etched stick having round notches 24. Round notches are less susceptible to breaking than notches with sharp corners.

Figure 5:
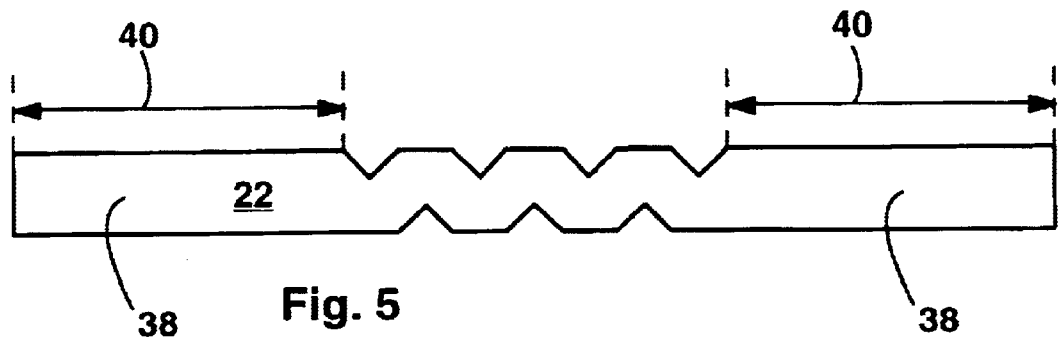
FIG. 5 shows a front view of an etched stick having long flanges.

FIG. 5 shows an etched stick having large flanges 38. Flanges provide surfaces for mating the etched sticks to one another. Flange length 40 can be about 0.5–10 millimeters, or about 1, 2, 4, 5 or 7 millimeters.

Figure 6A:
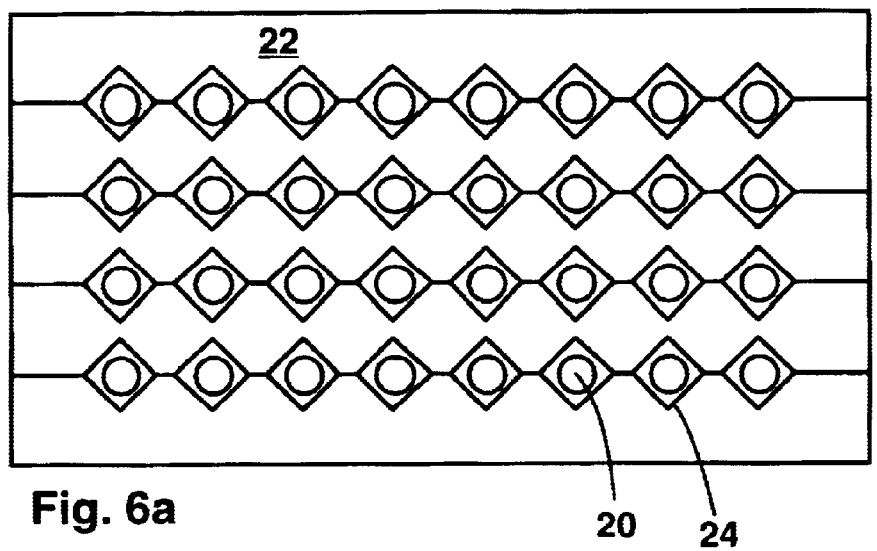
FIG. 6a shows a front view of a fiber array according to the present invention.

FIG. 6a shows a front view of a 2-D fiber array according to the present invention. The optical fibers 20 should be caged by the notches 24. In other words, the separation between the etched sticks should be determined by only the dimensions of the sticks, and not the diameter of the optical fibers 20. The notches 24 should be sized so that openings formed by the notches will always be larger than the largest optical fiber expected. An abnormally large optical fiber larger than the cages will dislocate the optical fibers in the array.

Figure 6B:
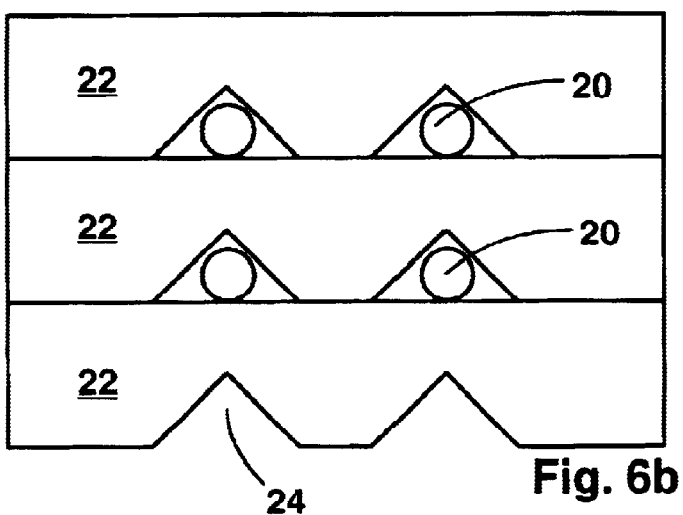
FIG. 6b shows a front view of a fiber array where the etched sticks have notches in only their top surface.

FIG. 6b shows a front view of an alternative embodiment of the present invention where the sticks 22 have notches 24 on one side only.

Figure 7:
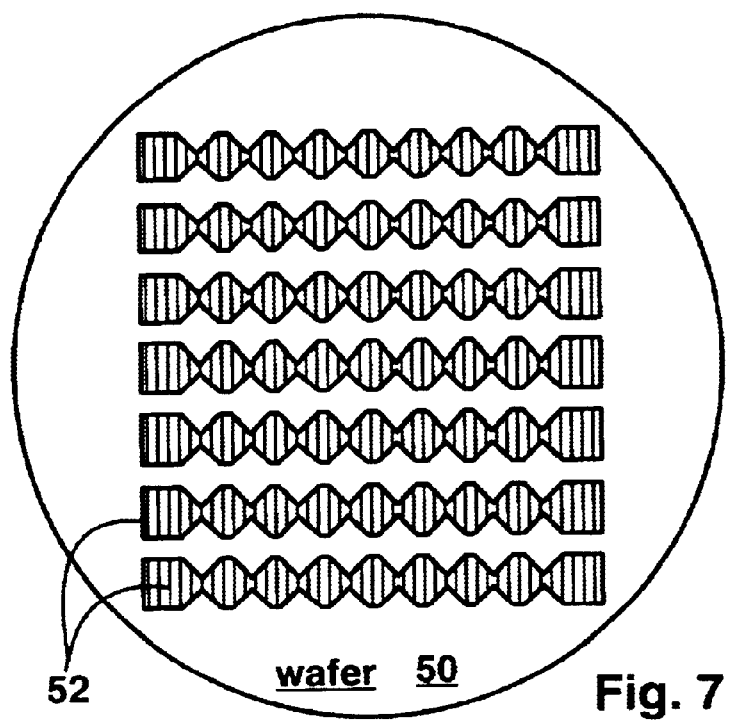
FIG. 7 shows a wafer and mask patterns used for making the etched sticks by directional dry etching.

As noted, the etched sticks 22 are made by directional dry etching (e.g. DRIE). FIG. 7 shows a top view of a wafer 50 and mask 52 for making the etched sticks. The mask shape is the shape of the etched sticks as viewed from the front (FIGS. 4a–4c and FIG. 5). The thickness of the wafer 50 is the thickness 26 of the etched sticks 22. The mask can be made of metal, silicon nitride, silicon oxide or many other materials known in the art. Preferably, the wafer is made of silicon. The mask may remain on the etched sticks, or it may be removed after the sticks are fabricated.

Figure 8:
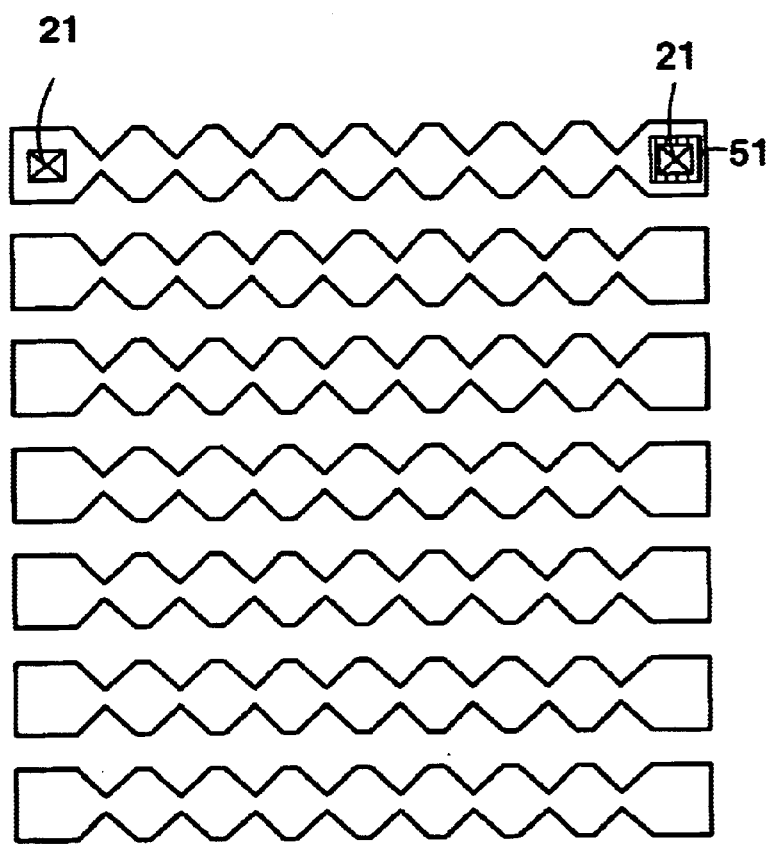
FIG. 8 shows etched sticks made by the mask in FIG. 7.

Dry etching completely through the wafer 50 of FIG. 7 produces the etched sticks shown in FIG. 8.

Preferably, if pits 21 are formed in the etched sticks, the pits 21 and sticks are fabricated using a single lithographic step process. For example, the metal masking method described in U.S. patent application Ser. No. 09/519,165 (herein incorporated by reference) by David Sherrer and Gregory Ten Eyck can be used to pattern the pits 21 and etched sticks using the same single lithographic mask. In this case, the pit 21 will generally be circumscribed by a metal ring 51. Defining the sticks and pits 21 in the same masking step assures that the pits are accurately located with respect to the notches.

Figure 9A:
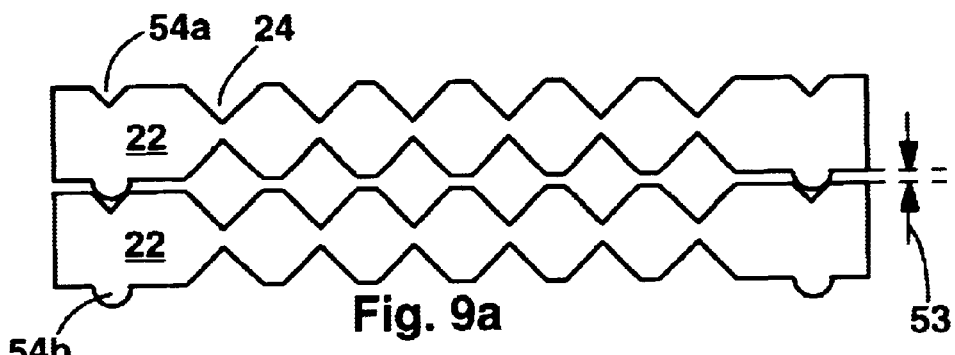
FIGS. 9a, 9b and 10 show alternative embodiments for the flanges.
Figure 9B:
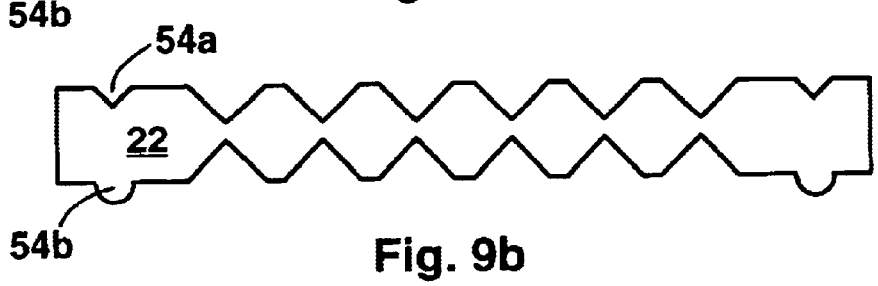

FIGS. 9a–b show front views of etched sticks having positive lateral alignment features 54b and negative lateral alignment features 54a. The lateral alignment features 54a, 54b are defined by the mask in the dry eetching process. The lateral alignment features 54 prevent the etched sticks from moving laterally (left-right) with respect to one another. This helps preserve optical fiber alignment. Preferably, the lateral alignment features 54a, 54b are designed so that a small gap 53 (e.g. 2–20 microns) exists between the sticks. The gap 53 helps to prevent dust particles from disturbing the alignment of the sticks. The positive and negative alignment features can have the complementary or different shapes.

Figure 10:
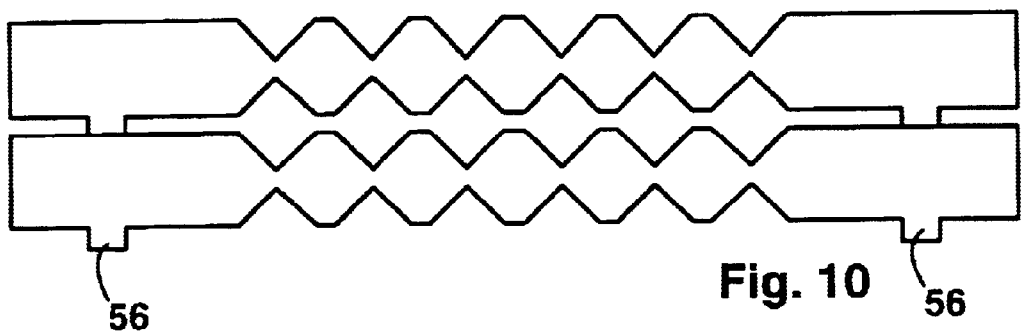

FIG. 10 shows a front view of etched sticks having pads 56 for a fixed separation between etched sticks 22. The pads 56 can provide the gap 53 so that contaminant particles do not interfere with fiber alignment.

Figure 11:
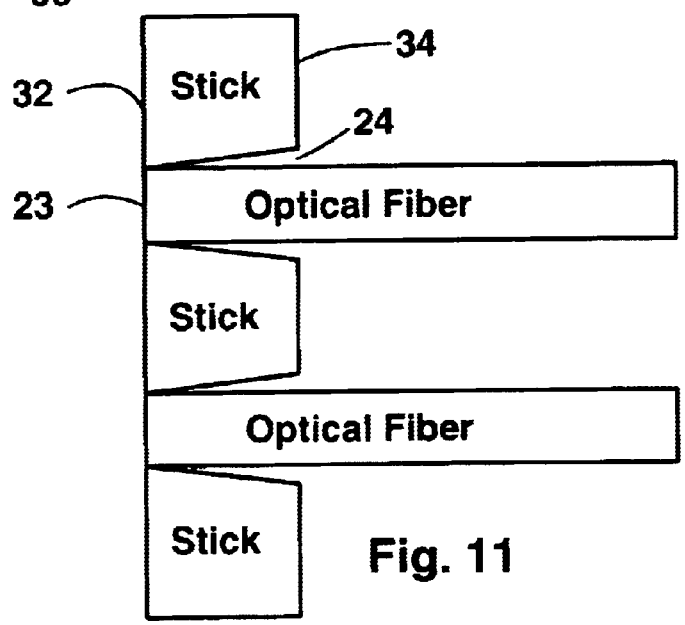
FIG. 11 shows a cross sectional side view of the fiber array.

FIG. 11 shows a cross sectional side view of a fiber array of the present invention. The front surface 32 was the surface masked during etching of the sticks 22. Undercutting during dry etching causes the notches 24 to be larger at the rear surface 34. Preferably, the front surface 32 and fiber endface 23 are flush as shown. The front surface 32 and fiber endface 23 can be polished simultaneously to produce a flush surface.

Figure 12:
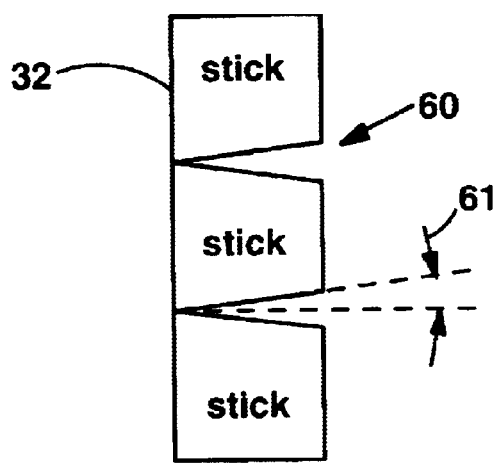
FIG. 12 shows a cross sectional side view of the array cut through the flanges.

FIG. 12 shows a cross sectional side view of stacked sticks cut through the flange 38. Here, the effect of undercutting during dry etching produces wedge-shaped gaps 60. For good contact between the flanges (i.e. contact at more than just the front surface 32), the gaps 60 should be as small as possible. This requires dry etching with essentially perfectly vertical sidewalls (zero undercut). The undercut of the dry etch is indicated by angle 61. Preferably, the directional dry etching used in making the sticks has an undercut angle of less than 1 degree. Generally, angle 61 should be as small as possible.

In an alternative method for making the etched sticks, a combination of directional dry etching and cleaving is used. Dry etching is used to create a perforated chip having holes sized and located for positioning optical fiber endfaces. Then, the perforated chip is cleaved into sticks.

Figure 13A:
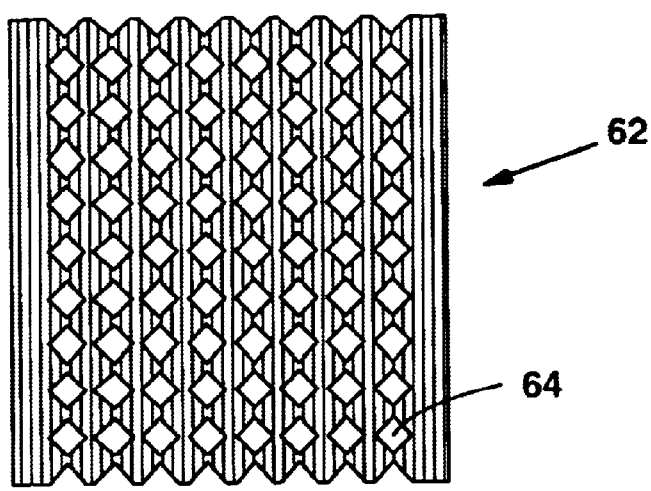
FIG. 13a shows a perforated chip used in making etched sticks according to a preferred embodiment of the present invention.

FIG. 13a shows a top view of a perforated chip 62. The perforated chip 62 has holes 64 that are sized and located for positioning optical fibers. In fact, the perforated chip may be used by inserting optical fibers into the holes 64 (but this is not part of the present invention). The perforated chip may be made of silicon, and may be about 300–1000 microns thick. The holes may be spaced at a pitch of about 250–500 microns. The perforated chip is preferably made using directional dry etching (DRIE), but other methods such as laser drilling or wet anisotropic etching of <100> silicon (forming square holes) may also be used. Directional dry etching is preferred because it is lithographically defined and hence extremely accurate.

Figure 13B:
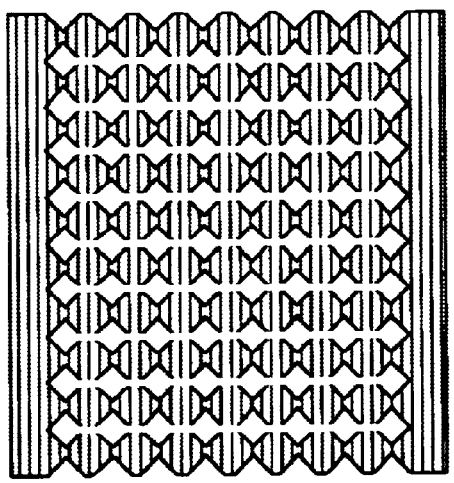
FIG. 13b shows shows a perforated chip that has joined holes. The perforated chip of FIG. 13b only need to be cleaved at the flanges to separate it into etched sticks.

FIG. 13b shows an alternative embodiment where the holes in the perforated chip are joined. The sticks comprising the perforated chip are only joined at the flange portion.

Figure 14:
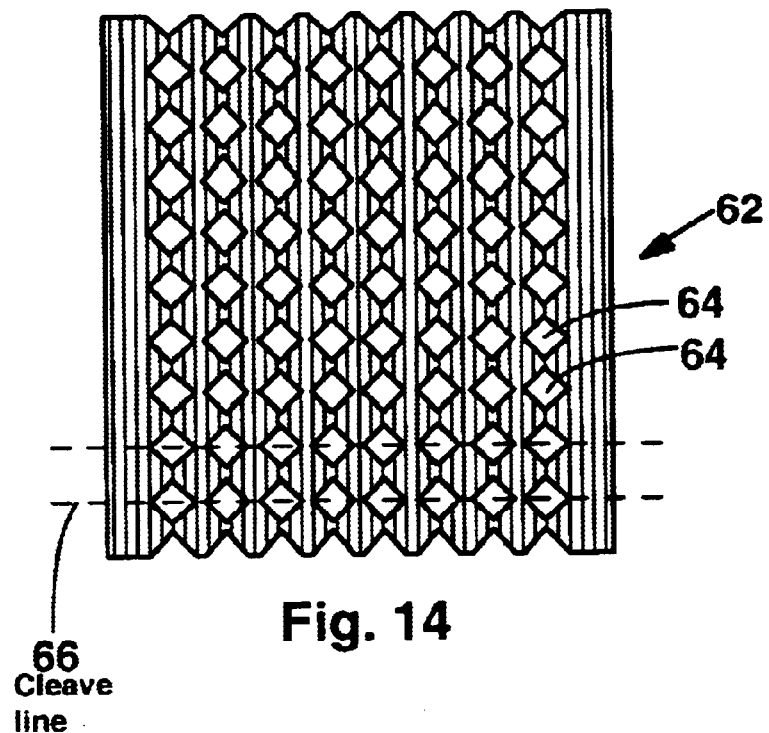
FIG. 14 shows the perforated chip is cleaved to separate it into etched sticks.

FIG. 14 shows the next step in making the fiber arrays of the present invention from the perforated chip 62. Here, the perforated chip 62 is cleaved along cleave lines 66. Cleaving separates the perforated chip into etched sticks. The cleave lines necessarily intersect the holes 64, forming notches 24. This allows optical fibers to be placed onto the notches, rather than inserted through the holes 64. In the case where the perforated chip has joined holes (shown in FIG. 13b), the perforated chip only needs to be cleaved at the flanges.

If the etched sticks 22 are separated by cleaving, then the top surface 25 and bottom surface 27 (shown in FIG. 2) are cleaved surfaces. When the etched sticks are reassembled with optical fibers to form the optical fiber array, it is preferable for the etched sticks to be stacked so that adjacent sticks in the perforated chip 62 is adjacent in the assembled 2-D array. In other words, cleaved surfaces are rejoined in the array. This helps to assure accurate alignment of the etched sticks because the rejoined surfaces are complementary. It is preferable for the sticks to be stacked so that adjacent cleaved surfaces on adjacent sticks are complementary. In the case where the perforated chip has joined holes (as in FIG. 13b), only the top and bottom surfaces of the flanges will be cleaved surfaces.

Figure 15:
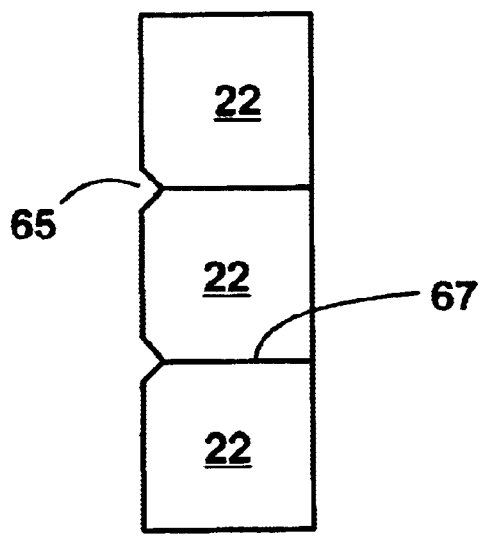
FIG. 15 shows a cross sectional side view of an array (cut through the flanges) made by cleaving.

FIG. 15 shows a cross sectional side view of 3 stacked sticks having cleaved top and bottom surfaces. The sticks may have scribe lines 65 used to facilitate cleaving. Sticks have good contact at surface 67 because these surfaces were cleaved and then rejoined. The surfaces are complementary because they were produced by cleaving.

The optical fiber arrays of the present invention are made by alternately stacking the etched sticks and optical fibers. Since the optical fibers do not have to be threaded through tiny holes, they are simple to make. However, during assembly, the sticks and fibers must be held in accurate alignment; preferably, mechanical fiduciaries are used to provide alignment during assembly of the array.

Figure 16:
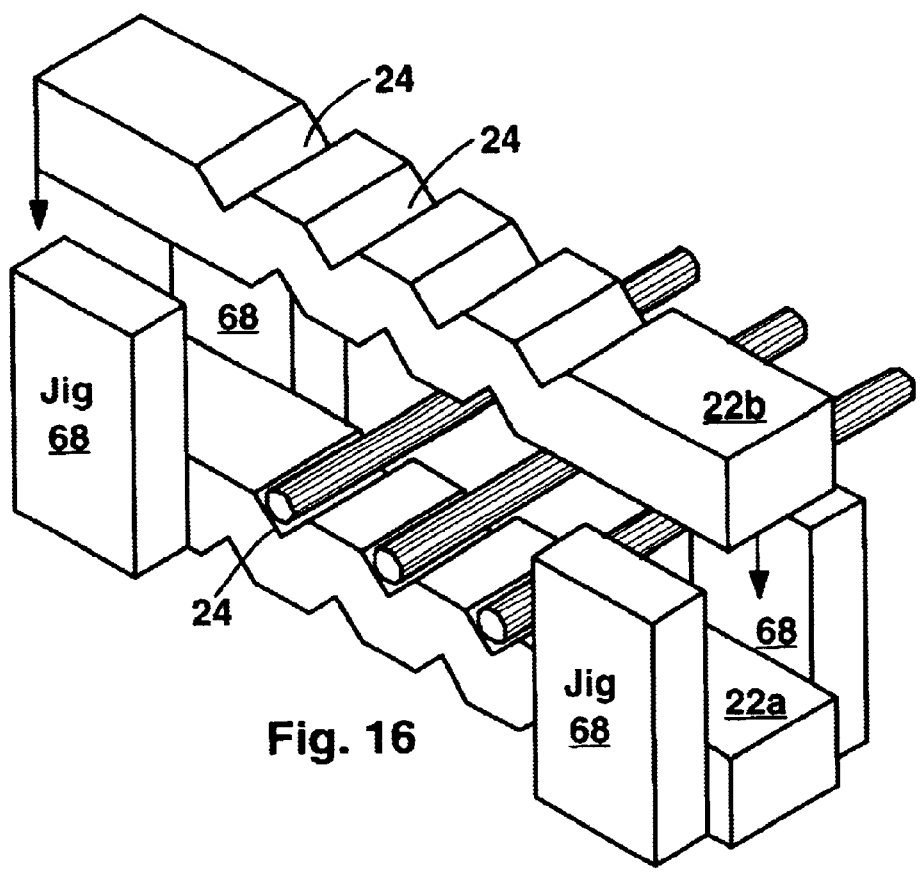
FIG. 16 shows a perspective view of a jig used for assembling the fiber array from optical fibers and etched sticks.

FIG. 16 shows a perspective view of a jig 68 used in assembly of the present optical fiber arrays. A first etched stick 22a is disposed in the jig 68, which holds the stick in a fixed position. Optical fibers 20 are placed in the notches 24 of the first etched stick 22a. After the fibers are placed, a second etched stick 22b, is disposed on top of the fibers and first etched stick. Fibers and sticks are stacked until the array is finished. The jig 68 may be made of metal, ceramic, plastic or any other material.

Optionally, pits 21 (shown in FIG. 1) are used to align the etched sticks in the jig. Pits 21 can be used for alignment by providing posts or raised features (not shown) on the surfaces of the jig 68. Posts on the jig 68 mate with the pits 21, providing passive alignment for the etched sticks.

Preferably, the sticks and optical fibers 20 are held together by glue such as UV curable epoxy. The glue can be applied and cured after the entire array has been assembled.

Alternatively, the sticks are fibers are held together using solder, diffusion bonds, chemical covalent bonds (e.g. Al-oxide bond), spin-on-glass (SOG), or sol-gel materials. For example, optical fibers and sticks can be coated with thin metal films and then soldered together. If the sticks are made of silicon and coated with gold (e.g. 200 angstroms) on top and bottom surfaces, then they can be diffusion bonded together. Gold diffusion bonding of silicon can be performed at temperatures low enough to avoid damaging the optical fibers. Spin-on-glass can be applied after the array is assembled; the array is heated after SOG application to form the glass.

Figure 17:
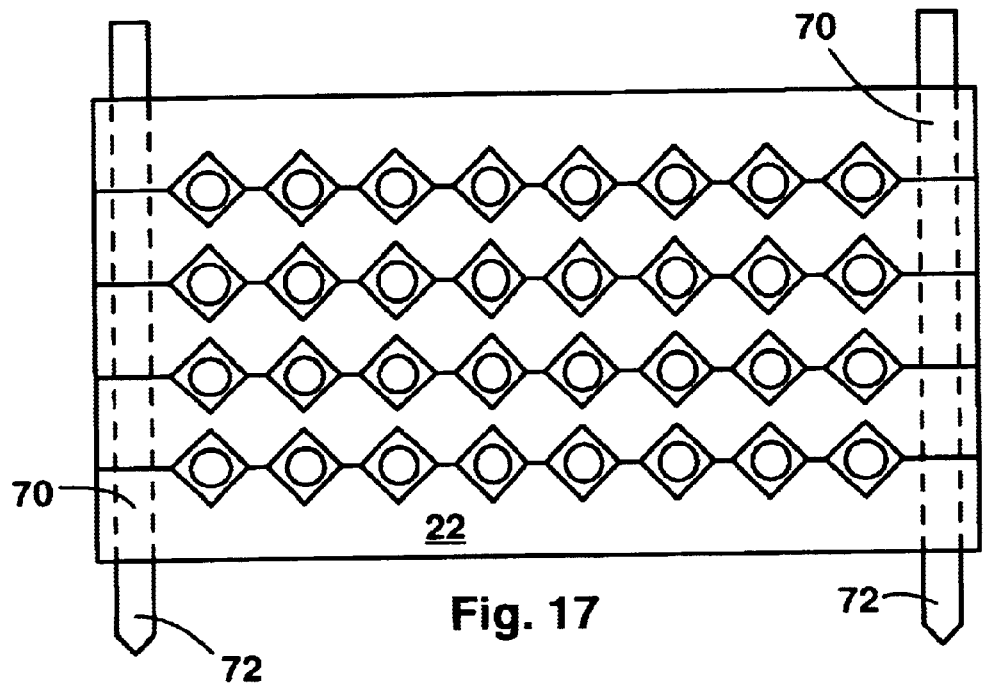
FIG. 17 shows a front view of a preferred embodiment where the etched sticks have alignment holes for improved alignment.

FIG. 17 shows a front view of a preferred embodiment of the present invention where the etched sticks have alignment holes 70. The alignment holes extend parallel to the front surface of the array and through the sticks (between top surface and bottom surfaces of the sticks. An alignment pin 72 (e.g. metal wire or glass fiber) is disposed with the alignment holes. The alignment holes and alignment pins help to fix the positions of the etched sticks.

Figure 18:
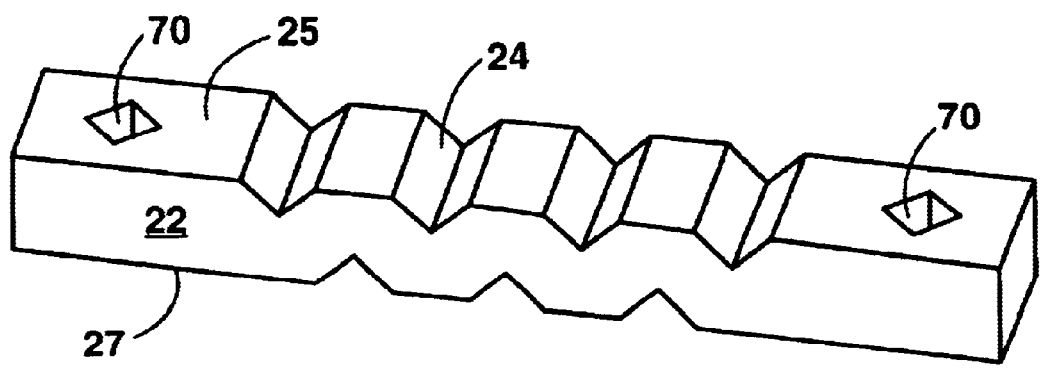
FIG. 18 shows a perspective view of a single etched stick having alignment holes.

FIG. 18 shows a single etched stick having alignment holes 70.

Figure 19:
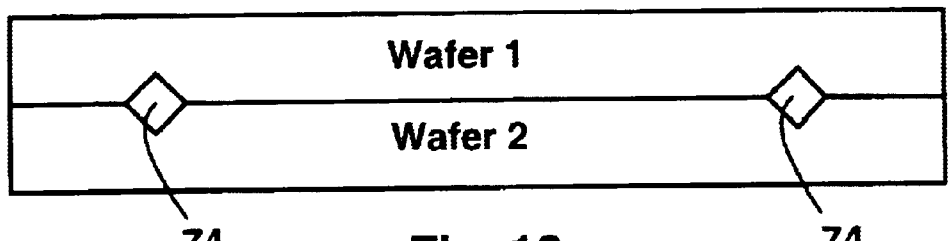
FIG. 19 shows an edge-on view of two bonded wafers used for making the etched sticks with alignment holes.

The alignment holes 70 can be made by bonding together two wafers having long grooves (e.g. such as anisotropically etched V-grooves in silicon). The grooves are aligned to form holes extending parallel to the wafer surface. FIG. 19 shows an edge-on view of two bonded wafers having V-grooves aligned to form holes 74. The holes 74 become alignment holes 70 when the wafers are cut or cleaved into etched sticks.

Figure 20:
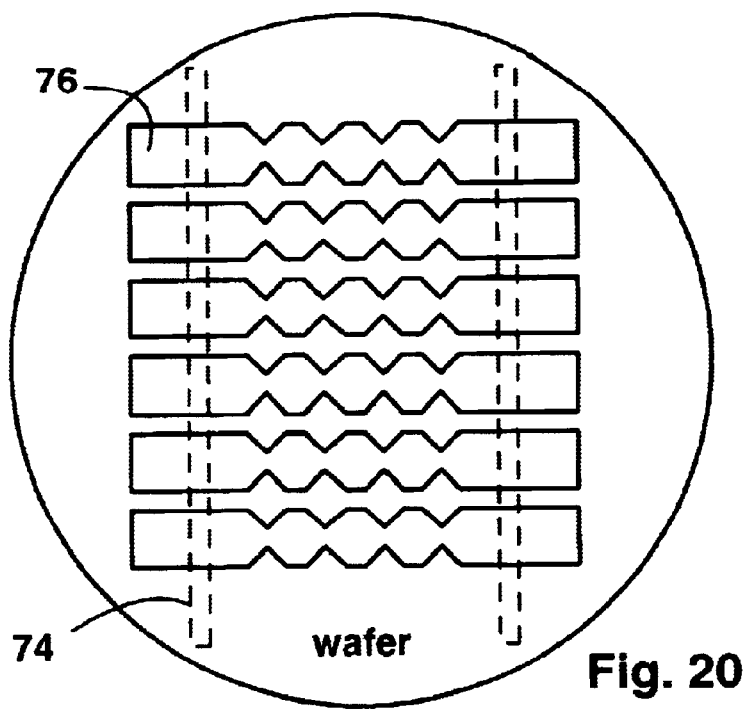
FIG. 20 shows a top view of a wafer and mask patterns used for making etched sticks with alignment holes.

FIG. 20 shows a top view of a wafer having holes 74 for providing alignment holes 70 in the etched sticks. Patterns 76 are masked for dry etching to form etched sticks.

Figure 21:
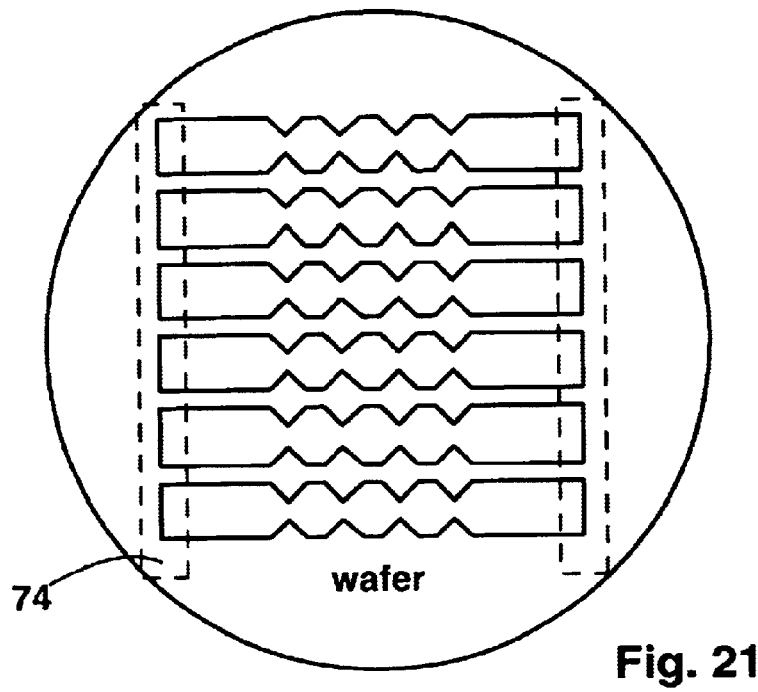
FIG. 21 shows a top view of a wafer and mask pattern used for making etched sticks with grooved endfaces.
Figure 22:
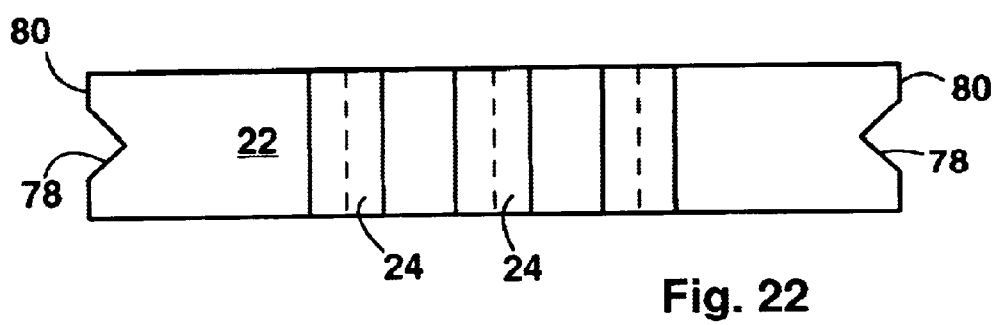
FIG. 22 shows a single etched stick having grooves endfaces.

The holes 74 and etched sticks can also be aligned as shown in FIG. 21. Here, the holes 74 are aligned to produce grooves in the endfaces of the etched sticks. FIG. 22 shows a top view of an etched stick having grooves 78 in the endfaces 80.

Figure 23:
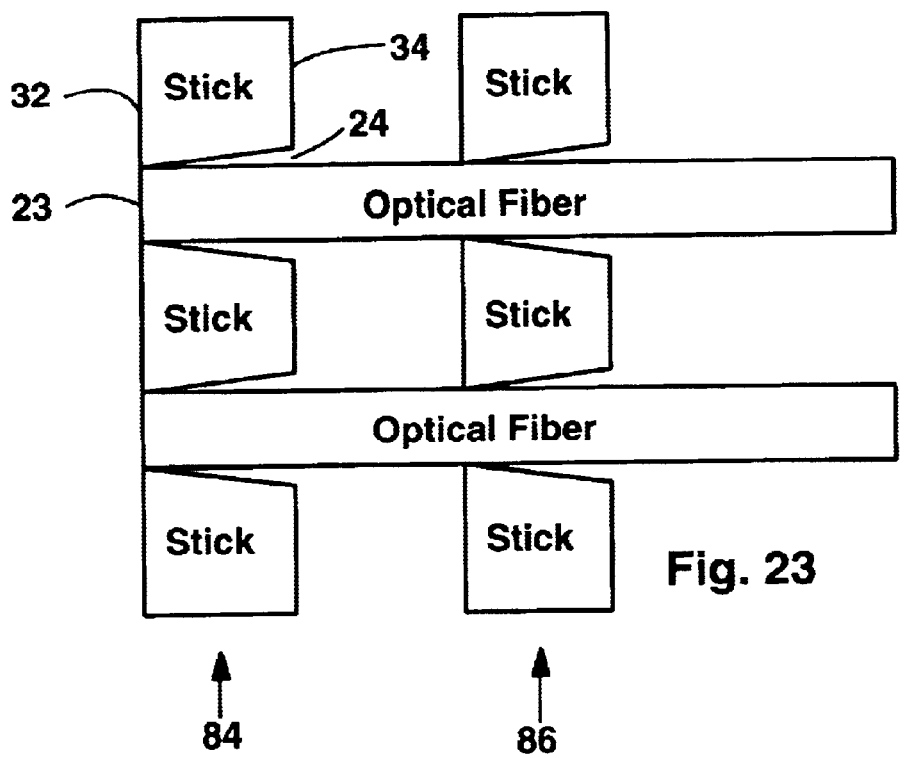
FIG. 23 shows a side view of a 2-D fiber array having two separate stacks of etched sticks. The relative position of the two stacks provide angular control of the optical fibers.

FIG. 23 shows another embodiment of the present invention where two stacks 84, 86 of etched sticks are used for alignment of a single array of fibers. Here, angular control of the optical fibers is provided by relatively positioning the two stacks.

Figure 24:
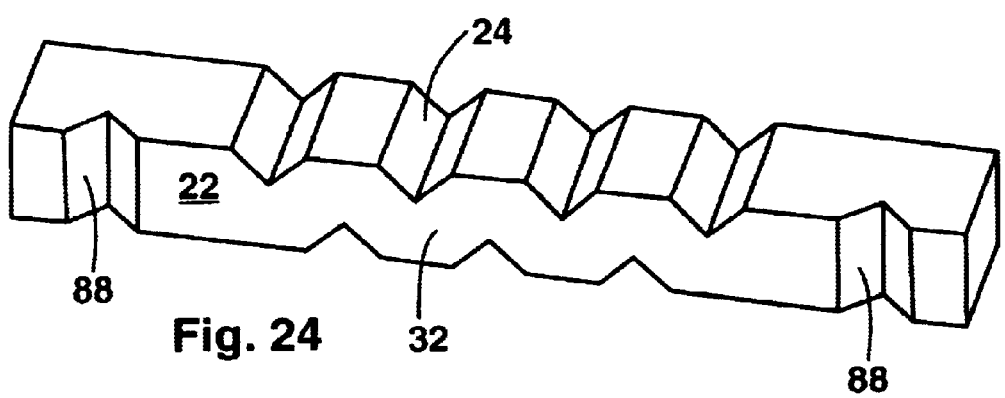
FIG. 24 shows an etched stick having vertically oriented V-grooves in the front surface. The V-grooves can be used to provide lateral alignment in the jig 68 of FIG. 16.

FIG. 24 shows another embodiment of the present invention where a stick has vertically oriented grooves 88 on the front surface 32. The grooves 88 can be formed (e.g. by anisotropic wet etching of silicon using KOH) prior to dry etching of the sticks. The grooves 88 can be used to provide lateral alignment of the etched sticks in the jig 68 of FIG. 16. For example, the jig 68 can have raised vertical lines for mating with the V-grooves 88. Of course, the V-grooves do not need to be V-shaped; the grooves can have any shape such as a U-shape provided by isotropic etching. Also, V-grooves can be oriented parallel with the length of the etched stick.

Figure 25:
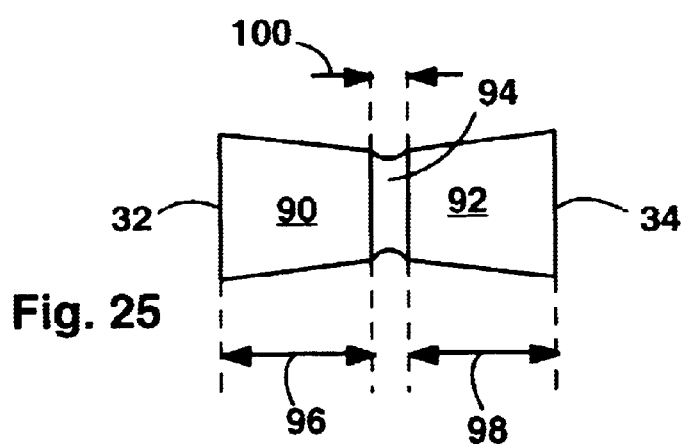
FIG. 25 shows a cross sectional side view of a double-sided etched stick.

FIG. 25 shows a cross sectional side view of a single stick according to an alternative embodiment of the present invention. Here, this stick is 'double-sided'; the stick has a front portion 90 and a rear portion 92. An etch-stop layer 94 (e.g. made of silicon nitride or silicon dioxide) separates the front and rear portions of the double-sided stick. The stick is made by directional dry etching from both the front surface 32 and the rear surface 34. The stick is made by dry etching the front portion 90 from the front surface 32 to the etch stop layer 94 and dry etching the rear portion 92 from the rear surface to the etch stop layer 94.

The thicknesses 96, 98 of the front portion 90 and rear portion 92 can be in the range of about 0.3–2 millimeters, more preferably in the range of about 0.4–0.8 millimeters. The etch stop layer 94 can have a thickness 100 in the range of about 0.1–5 microns. The etch stop layer is only required for stopping the stretch process and for bonding together the front portion and rear portion.

Figure 26:
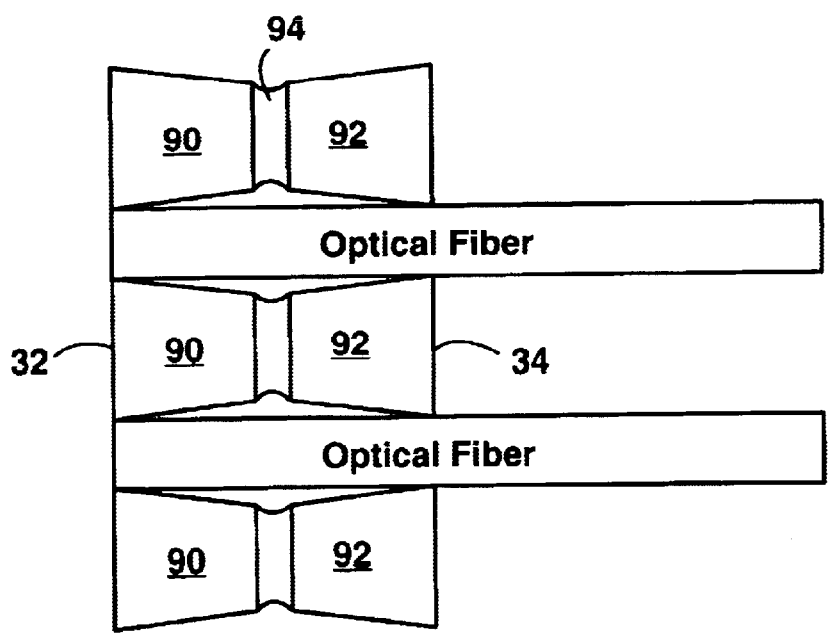
FIG. 26 shows a cross sectional side view of a 2-D array made from double-sided etched sticks.

FIG. 26 shows a cross sectional side view of a 2-D fiber array made with sticks shown in FIG. 25. The optical fibers contact the double-sided sticks at the front surface 32 and the rear surface 34. Two points of contact between the sticks and fibers provide improved alignment compared to the embodiment of FIGS. 1 and 11, where the optical fibers tend to contact the sticks only at the front surface 32. Also, the embodiment of FIG. 26 provides improved angular alignment of the optical fibers since the fibers are constrained at both the front surface 32 and rear surface 34.

In a double-sided etched stick, the front surface 32 and rear surface 34 may be identical.

Figure 27:
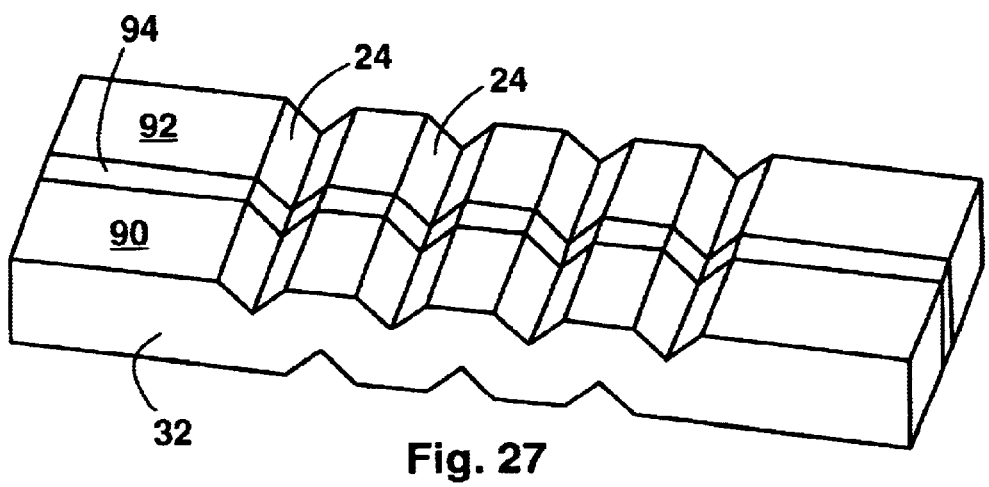
FIG. 27 shows a perspective view of a double-sided etched stick.

FIG. 27 shows a perspective view of a single double-sided etched stick. The undercut angle cannot be seen in this view because the undercut angle is typically very small (e.g. about 1–3 degrees). The notches 24 extend through both the front portion 90 and the rear portion 92.

FIGS. 28a–28e Illustrate a method for making the double-sided etched sticks shown in FIGS. 25, 26, and 27.

Figure 28A:
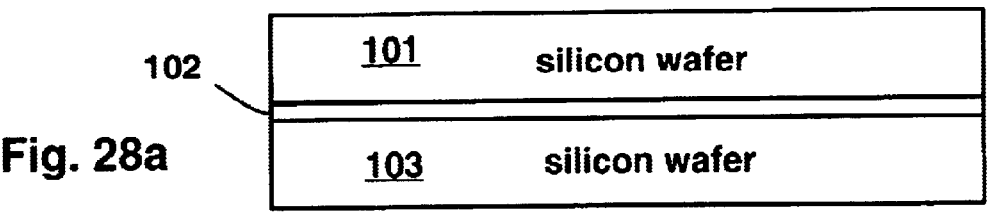
FIGS. 28a–28e illustrate a preferred method for making a double-sided etched stick.
Figure 28B:
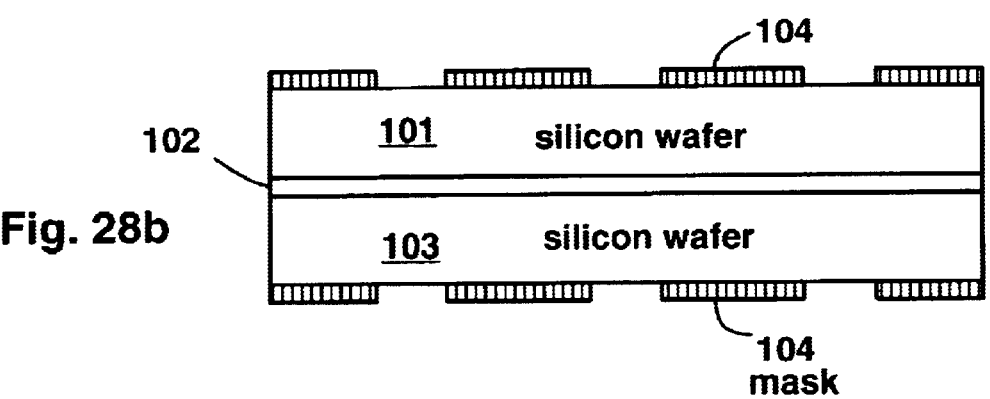
Figure 28C:
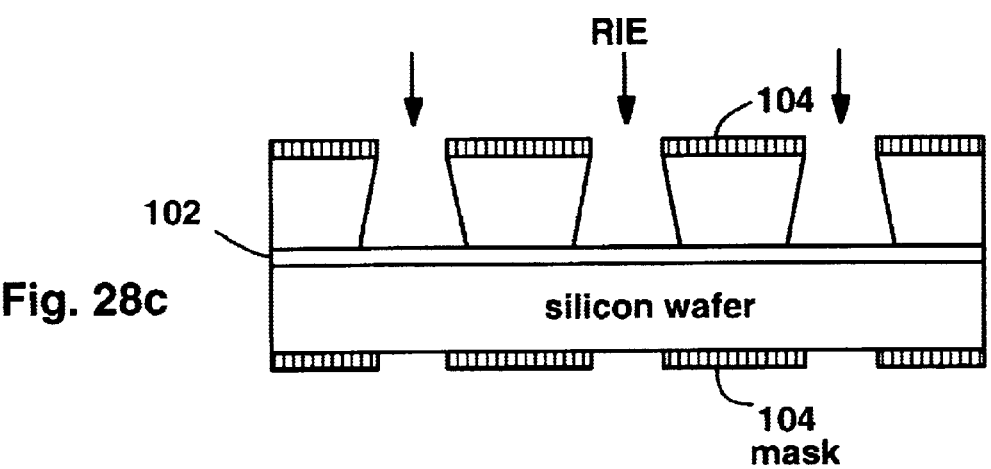
Figure 28D:
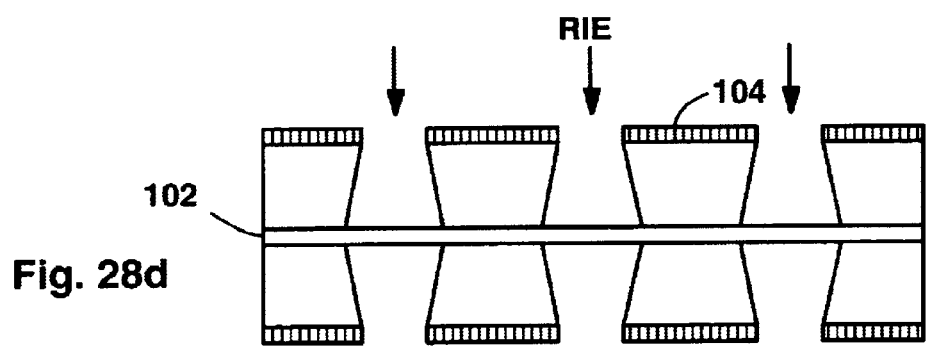
Figure 28E:
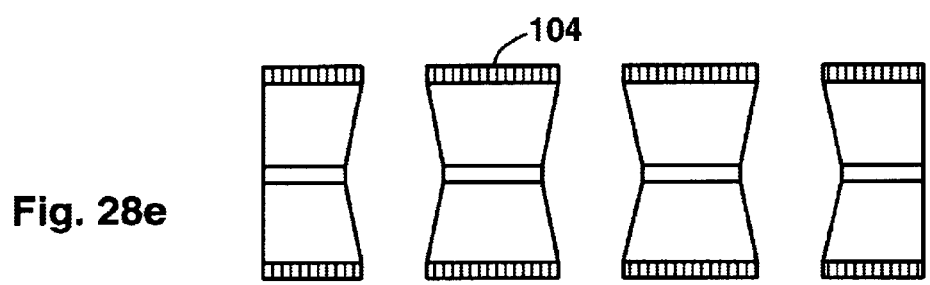

FIG. 28a—Top and bottom silicon wafers 101, 103 are bonded together with an intervening etch stop layer 102. The silicon wafers can have the same or different thicknesses. This structure is essentially the same as an SOI wafer. The thicknesses of the wafers determines (i.e. is equal to) the thickness of the front portion and rear portion of the etched sticks.

28a–28b—Both sides of the wafer are identically patterned with a dry etch mask 104 (e.g. silicon nitride, metal, silicon dioxide). The patterns on both sides of the wafer should be aligned.

28b–28c—Directional dry etching is performed on the top wafer down to the etch stop layer.

28c–28d—Directional dry etching is performed on the bottom wafer down to the etch stop layer.

28d–28e—The etch stop layer 102 is removed from exposed areas (e.g. by wet etching), to separate the sticks. The mask 104 may remain on the final product.

It is noted that pits 21 and V-grooves 88 can be formed on the double-sided sticks. In fact, pits 21 and/or V-grooves 88 can be formed on the front surface, rear surface, or both surfaces.

It is also noted that a small misalignment is possible between the masks on the top and bottom silicon wafers. This will result in the notch having slightly different locations in the front portion and the rear portion. A small misalignment is tolerable if the thickness of the etched stick (i.e. front portion thickness+etch stop layer thickness+rear portion thickness) is great enough. An optical fiber can bend slightly to accommodate a small misalignment between the front portion and rear portion notches. For example, a front-rear misalignment of 1–3 microns is tolerable for a total stick thickness of 1500 microns where 125-micron diameter optical fiber is used. A 125-micron diameter optical fiber can bend 1–3 microns over a length of 1500 microns without problems.

It is also noted that in the case where the etched sticks are cleaved, the holes for the optical fibers can be shaped to aid in cleaving. For example, the holes can be diamond-shaped with sharp corners so that a cleave crack propagates through the corners of the holes.

It is also noted that the notches can have many different shapes within the present invention. The notches can be shaped like ½ an ellipse, ½ a square, or ½ a circle, for example.

It will be clear to one skilled in the art that the above embodiment may be altered in many ways without departing from the scope of the invention. Accordingly, the scope of the invention should be determined by the following claims and their legal equivalents.

What is claimed is:

1. An apparatus for aligning optical fibers in a 2-dimensional array, comprising:
   a) a plurality of etched sticks, each stick having a plurality of notches and a front surface, wherein the etched sticks are stacked so that the notches form cages;
   b) optical fibers disposed in the cages and oriented perpendicular to the front surfaces in a 2-dimensional array;
   wherein the notches have surfaces that are directional dry etched sidewall surfaces formed by directional dry etching perpendicular to the front surface.

2. The apparatus of claim 1 wherein the etched sticks have top and bottom surfaces, and the top and bottom surfaces are directional dry etched sidewall surfaces.

3. The apparatus of claim 1 wherein the etched sticks have top and bottom surfaces, and the top and bottom surfaces are cleaved surfaces.

4. The apparatus of claim 3 wherein the sticks are stacked so that adjacent cleaved surfaces on adjacent sticks are complementary.

5. The apparatus of claim 1 wherein directional dry etched surfaces are undercut less than 1 degree.

6. The apparatus of claim 1 wherein the etched sticks are made of silicon and are diffusion bonded together.

7. The apparatus of claim 1 wherein the etched sticks have top and bottom surfaces, and the top and bottom surfaces each have at least one notch.

8. The apparatus of claim 1 wherein the etched sticks have top and bottom surfaces, and the bottom surface of at least one etched stick does not have a notch.

9. The apparatus of claim 1 wherein the etched sticks have a thickness in the range of 300–1000 microns.

10. The apparatus of claim 1 wherein the etched sticks have flanges in the range of 1–20 millimeters long.

11. The apparatus of claim 1 wherein the etched sticks have alignment holes.

12. The apparatus of claim 11 further comprising alignment rods disposed in the alignment holes.

13. The apparatus of claim 1 wherein the sticks have positive and negative lateral alignment features.

14. The apparatus of claim 13 wherein the lateral alignment features are designed so that the sticks are separated by a gap.

15. The apparatus of claim 1 wherein the sticks are bonded by spin-on-glass.

16. The apparatus of claim 1 wherein at least one stick has a pit in the front surface.

17. The apparatus of claim 1 wherein at least one stick has a groove in the front surface.

18. The apparatus of claim 1 wherein at least one etched stick is a double-sided stick having:
   a) a front portion;
   b) a rear portion;
   wherein the notch extends through the front portion and the rear portion, and c) an etch stop layer disposed between the front portion and the rear portion, wherein the etch stop layer is bonded to the front portion and the rear portion.

19. The apparatus of claim 18 wherein the front portion and the rear portion each have a thickness in the range of 300–1000 microns.

20. The apparatus of claim 18 wherein the front portion and the rear portion each have a thickness in the range of 300–1000 microns.

21. An apparatus according to claim 1 wherein said etched sticks are formed from a wafer having a wafer thickness direction and wherein said optical fiber extends in a direction parallel with said wafer thickness direction.

22. The apparatus of claim 1 wherein the sticks are formed of single crystal silicon.

23. An apparatus for aligning optical fibers in a 2-dimensional array, comprising:
   a) a plurality of etched slicks each having a plurality of notches and a front surface, wherein the etched sticks are stacked so that the notches form cages;
   b) optical fibers disposed in the cages and oriented perpendicular to the front surfaces in a 2-dimensional array;
      wherein the etched sticks have top and bottom surfaces, and the top and bottom surfaces are cleaved surfaces; and
      wherein said sticks are formed by etching a wafer having a wafer thickness direction such that said wafer thickness direction is parallel to said optical fibers disposed in said cages.

24. The apparatus of claim 23 wherein the sticks are stacked so that adjacent cleaved surfaces an adjacent sticks are complementary.

25. The apparatus of claim 23 wherein the etched sticks are made of silicon and are diffusion bonded together.

26. The apparatus of claim 23 wherein the etched sticks have top and bottom surfaces, and the top and bottom surfaces each have at least one notch.

27. The apparatus of claim 23 wherein the etched sticks have top and bottom surfaces, and the bottom surface of at least one etched stick does not have a notch.

28. The apparatus of claim 23 wherein the etched sticks have a thickness in the range of 300–1000 microns.

29. The apparatus of claim 23 wherein the etched sticks have flanges at least 1 millimeter long.

30. The apparatus of claim 23 wherein the etched sticks have alignment holes.

31. The apparatus of claim 30 further comprising alignment rods disposed in the alignment holes.

32. The apparatus of claim 30 wherein the sticks are formed of single crystal silicon.

33. The apparatus of claim 23 wherein the notches have surfaces that are directional dry etched sidewall surfaces formed by directional dry etching perpendicular to the front surface.

34. The apparatus of claim 23 wherein the notches have surfaces that are laser drilled sidewall surfaces formed by laser drilling perpendicular to the front surface.

35. The method of claim 34 wherein the sticks are formed of single crystal silicon.

36. The apparatus of claim 23 wherein the notches have surfaces that are anisotropically wet etched sidewall surfaces formed by anisotropic wet etching perpendicular to the front surface, and wherein the sticks are made of single crystal silicon.

37. The apparatus of claim 23 wherein the sticks are bonded by spin-on-glass.

38. The apparatus of claim 23 wherein at least one stick has a pit in the front surface.

39. The apparatus of claim 23 wherein at least one stick has a groove in the front surface.

40. The apparatus of claim 23 wherein at least one etched stick is a double-sided stick having:
   a) a front portion;
   b) a rear portion;
   wherein the notch extends through the front portion and the rear portion, and
   c) an etch stop layer disposed between the front portion and the rear portion,
   wherein the etch stop layer is bonded to the front portion and the rear portion.

41. A method for making a 2-dimensional optical fiber array, comprising the steps of:
   a) forming a perforated chip having a plurality of holes located according to a 2-dimensional pattern, wherein the holes are located along lines;
   b) cleaving the chip along the lines of holes so the perforated chip is separated into etched sticks, whereby the holes form notches in the etched sticks; and
   c) stacking the etched sticks with optical fibers disposed in the notches so that the optical fibers are arranged according to the 2-dimensional pattern.

42. The method of claim 41 wherein the etched sticks are stacked so that complementary cleaved surfaces are rejoined.

43. The method of claim 41 wherein step (a) is performed by directional dry etching.

44. A method for making a 2-dimensional optical fiber array, comprising the steps of:
   a) directionally dry etching a plurality of etched sticks from a flat substrate,
   wherein each etched stick has a plurality of notches, and wherein each etched stick has top and bottom surfaces defined by a mask during directional dry etching; and
   b) stacking the etched sticks with optical fibers disposed in the notches so that the optical fibers are arranged in a 2-dimensional pattern and so that the optical fibers are caged by the notches, and so that the optical fibers are oriented essentially parallel with the directional dry etching direction.

45. The method of claim 44 wherein the sticks are formed of single crystal silicon.

* * * * *